(12) United States Patent
Levanoni et al.

(10) Patent No.: US 9,471,392 B2
(45) Date of Patent: *Oct. 18, 2016

(54) USE OF METRICS TO CONTROL THROTTLING AND SWAPPING IN A MESSAGE PROCESSING

(75) Inventors: Yossi Levanoni, Redmond, WA (US); Sanjib Saha, Bothell, WA (US); Bimal Kumar Mehta, Sammamish, WA (US); Paul Maybee, Seattle, WA (US); Lee Graber, Kirkland, WA (US); Balasubramanian Sriram, Sammamish, WA (US); Eldar Azerovich Musayev, Sammamish, WA (US); Kevin Bowen Smith, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1886 days.

This patent is subject to a terminal disclaimer.

(21) Appl. No.: 12/172,984

(22) Filed: Jul. 14, 2008

(65) Prior Publication Data
US 2008/0276238 A1    Nov. 6, 2008

Related U.S. Application Data

(63) Continuation of application No. 10/714,157, filed on Nov. 14, 2003, now Pat. No. 7,412,513.

(51) Int. Cl.
*G06F 15/16* (2006.01)
*G06F 9/50* (2006.01)

(52) U.S. Cl.
CPC .................. *G06F 9/5083* (2013.01)

(58) Field of Classification Search
CPC ...................................... G06F 9/5083
USPC ................ 709/217, 219, 225; 710/200, 240; 718/104, 105
See application file for complete search history.

(56) References Cited

U.S. PATENT DOCUMENTS

| | | | |
|---|---|---|---|
| 5,758,184 A | 5/1998 | Lucovsky et al. | 395/826 |
| 5,768,258 A | 6/1998 | Van As et al. | 370/236 |
| 6,038,604 A | 3/2000 | Bender et al. | 709/233 |
| 6,070,189 A | 5/2000 | Bender et al. | 709/224 |
| 6,088,511 A | 7/2000 | Hardwick | 395/28 |
| 6,106,575 A | 8/2000 | Hardwick | 717/6 |
| 6,212,617 B1 | 4/2001 | Hardwick | 712/3 |
| 6,223,207 B1 | 4/2001 | Lucovsky et al. | 709/107 |
| 6,292,822 B1 | 9/2001 | Hardwick | 709/105 |
| 7,003,572 B1* | 2/2006 | Lownsbrough et al. | 709/227 |
| 7,412,513 B2* | 8/2008 | Levanoni et al. | 709/225 |
| 2002/0169889 A1* | 11/2002 | Yang et al. | 709/244 |
| 2002/0183972 A1* | 12/2002 | Enck et al. | 702/186 |
| 2004/0111506 A1* | 6/2004 | Kundu et al. | 709/223 |

OTHER PUBLICATIONS

Witte, K., "Pipelining and Throttling Speed Data Transfers", *EDN*, Aug. 22, 1985, 30(19), 187-194.

* cited by examiner

*Primary Examiner* — Douglas Blair
(74) *Attorney, Agent, or Firm* — Ben Tabor; Kate Drakos; Micky Minhas (57) ABSTRACT

A system and method of using metrics to control throttling and swapping in a message processing system is provided. A workload status of a message processing system is determined, and the system polls for a new message according to the workload status. The message processing system identifies a blocked instance and calculates an expected idle time for the blocked instance. The system dehydrates the blocked instance if the expected idle time exceeds a predetermined threshold.

20 Claims, 6 Drawing Sheets

USE OF METRICS TO CONTROL THROTTLING AND SWAPPING IN A MESSAGE PROCESSING

CROSS-REFERENCE TO RELATED APPLICATIONS

This application is a continuation of U.S. patent application Ser. No. 10/714,157 filed Nov. 14, 2003, entitled "SYSTEMS AND METHODS FOR USING METRICS TO CONTROL THROTTLING AND SWAPPING IN A MESSAGE PROCESSING SYSTEM", which is hereby incorporated by reference, in its entirety.

TECHNICAL FIELD

The present invention relates generally to software development. More particularly, the present invention relates to a method and system for optimizing system performance for a given workload by controlling the arrival of new work and managing the processing of existing work. Even more particularly, the present invention relates to a method and system for using performance metrics for controlling throttling of new messages and swapping of existing processes in a message processing system.

BACKGROUND

An entity may use a software application, such as a web service, to automate various processes and to interact with other entities in a distributed environment, such as the Internet or World Wide Web, or a corporate intranet or wide area or local area network. To ensure that such interactions are accomplished successfully, one or more protocols should be in place for carrying messages to and from participants, and specific applications should also be in place at each participant's end. Such interactions are message-driven. For example, a buyer sends a purchase order to a seller. The seller then checks its inventory to determine if it can provide the ordered items. If so, the seller sends an acknowledgement back to the buyer with a price. Finally, the buyer accepts or rejects the seller's offer (and/or possibly places another order). As evident in this example, each participant's application reacts to the receipt of messages.

Many such interactions and processes may take place at a given time. In addition, the same interaction may be carried out at the same time between different parties. For example, the buyer may send several purchase orders to different sellers. Thus, at any given time multiple instances of each interaction and/or an instance of many different processes may need to be processed. A conventional system for processing such messages may become overburdened when messages arrive too quickly for the system to handle, or when too many interactions or other processes are occupying resources without making progress toward completion.

An example of a situation where a message processing system may become overburdened is when the arrival rate of messages becomes too great. In such a situation, the system expends a large percentage of available resources on servicing the arrival of the messages —such as determining to which instance each message belongs, whether the message requires the creation of a new instance, and so forth—which leaves few resources available to actually process the messages. A system in such a state is said to be "thrashing." In addition, a large amount of processing power is typically required to process a message, which complicates the issue of handling a large number of arriving messages. For example, when processing a message the system may need to update one or more database entries based on the message, transmit one or more messages, and so forth. Therefore, as the processing power required to process a message increases, the number of incoming messages required to overburden the message processing system decreases. When a system receives a greater number of messages than it can adequately process, the system can produce errors, loose data, or may simply become very slow and/or unresponsive. For example, in the above buyer/seller scenario, the transaction may be delayed, the messages with the buyer's and/or seller's instructions may be lost or corrupted, and/or the entire transaction aborted as a result of the system's inability to adequately process the messages.

A conventional message processing system that experiences such overburdening issues is also especially vulnerable to "denial of service" computer attacks. In such attacks, a hostile party transmits a very large number of messages to a particular message processing system. The system becomes overwhelmed when attempting to process the messages, and as a result the process(es) the system is supposed to be running are adversely affected or interrupted entirely.

Accordingly, and in light of the above shortcomings, what is needed is a system and method for throttling, or controlling the arrival rate of new messages, and selectively moving work that is already being processed into secondary storage. More particularly, what is needed is an agent that retrieves a new message and directs such a message to its instance. Even more particularly, what is needed is a controller that uses feedback from the instance state to control instance swapping to optimize performance of the message processing system

SUMMARY

In light of the foregoing limitations and drawbacks, a system and method of using metrics to control throttling and swapping in a message processing system is provided. In the inventive method, a workload status of a message processing system is determined, and the system polls for a new message according to the workload status. The message processing system identifies a blocked instance and calculates an expected idle time for the blocked instance. The system dehydrates the blocked instance if the expected idle time exceeds a predetermined threshold. In one embodiment, the workload status of the system is updated according to the dehydration. In another embodiment, the system polls for a new message at a frequency that is inversely proportional to the system's workload. In yet another embodiment, the system polls only for a new non-activation message.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary embodiments of the invention; however, the invention is not limited to the specific methods and instrumentalities disclosed. In the drawings.

OVERVIEW

A system and method of improving the efficiency of a message processing system is disclosed herein. Performance data, or metrics, are used to determine the overall workload of such a system and to determine whether the system is overburdened with messages. In response to such a determination, the number and/or type of new messages may be restricted so as to enable the system to process the existing work. In addition, metrics are used to predict how long an idle process will remain idle, thereby enabling a determination as to whether the system should move the process out of active memory and into secondary storage, thereby improving system performance. Such determinations can be made in a static or dynamic manner.

Before discussing the invention in detail, we will first describe exemplary computing and network environments in which the invention may be advantageously practiced.

Exemplary Computing Environment

Figure 1:
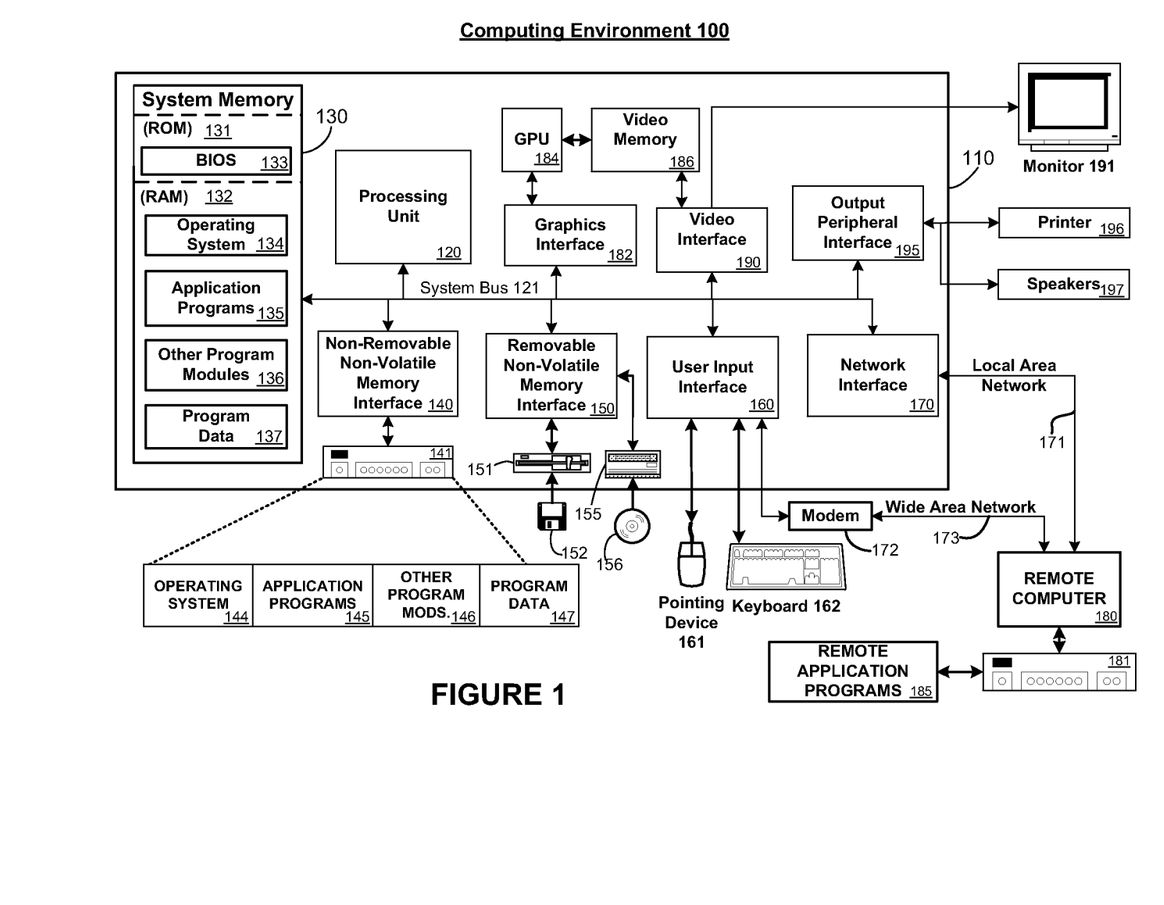
FIG. 1 is a diagram illustrating an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190, and video interface 190 and monitor 191 may be associated with a graphics interface 182, a graphics processing unit (GPU) 184, and video memory 186 in a generally known manner. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Distributed Computing Frameworks Or Architectures

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, MICROSOFT®'s .NET platform includes servers, building-block services, such as web-based data storage, and downloadable device software. Generally speaking, the .NET platform provides (1) the ability to make the entire range of computing devices work together and to have user information automatically updated and synchronized on all of them, (2) increased interactive capability for web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While exemplary embodiments herein are described in connection with software residing on a computing device, one or more portions of the invention may also be implemented via an operating system, API, or middleware software between a coprocessor and requesting object, such that services may be performed by, supported in, or accessed via all of .NET's languages and services, and in other distributed computing frameworks as well.

Introduction to Web Services

As noted above, entities—such as businesses—are more frequently interacting via distributed environments, such as the Internet or World Wide Web. For example, a consumer may want to know the prices of rental cars for an upcoming trip. The consumer may request the prices through an intermediate business on the Internet, such as a travel website. The intermediate business, upon receiving the consumer's request, sends price quote requests to a variety of rental car businesses. After responses are received from the rental car businesses, the intermediate business then sends the responses to the consumer. The consumer may then reserve a car and pay for the reservation by way of the intermediate business. As noted above, such business processes are implemented using messages. For example, the consumer's request to the intermediate business is implemented as an electronic message to the intermediate business that contains the particulars of the proposed car rental, for example: rental dates and times, type of car, additional insurance desired, consumer's name and address, credit card information and/or the like. The intermediate business' price quote request is another message, as are the responses from the rental car businesses—both to the intermediate business from the rental car businesses and from the intermediate business to the consumer—and the reservation ultimately sent by the consumer.

Distributed computer languages are designed to automate business processes and the messages used to carry out such processes. One such language is XLANG/s, which is described in more detail below. As may be appreciated, it is important that the business processes that are implemented using XLANG/s execute properly, and as efficiently as possible. A system processing messages in accordance with a language such as XLANG/s should be capable of managing its processing of arriving messages in such a way as to be able to continue processing on existing messages. Providing a method and system for managing such message processing in an efficient manner is an application of an embodiment of the present invention.

XLANG/s Introduction

An embodiment of the present invention is implemented in a distributed computing language. As noted above, one such language that is compatible with an embodiment of the present invention is XLANG/s. XLANG/s is a language that describes the logical sequencing of business processes, as well as the implementation of the business process by using various technology components or services. XLANG/s is described in more detail than is disclosed herein in a document titled "XLANG/s Language Specification," Version 0.55, Copyright© Microsoft 1999-2000, and a document titled "XLANG Web Services For Business Process Design," Satish Thatte, Copyright© Microsoft Corporation 2001, both of which are hereby incorporated by reference in their entirety. The XLANG language is expressed in Extensible Markup Language (XML). XLANG/s is a modern, domain specific, special purpose language used to describe business processes and protocols. XLANG/s is also a declarative language, which means that it defines an explicit instruction set that describes and implements steps in a business process, the relationship between those steps, as well as their semantics and interactions. In addition, XLANG/s code is not just descriptive; it is also designed to be executable. Because of the declarative nature of XLANG/s and its specific semantics, the resulting executable code is deterministic; that is, the behavior of the running business process is well defined by the semantics of the collection of XLANG/s instructions. Therefore, by examining XLANG/s code one is able to determine the business process that is carried out by such code. As noted above, the definition of such a business process in executable form is an "orchestration service."

XLANG/s is compatible with many Internet standards. XLANG/s is designed to use XML, XSLT, XPATH, XSD (XML Schema Definition) and WSDL (Web Services Description Language) as supported standards and has embedded support for working with .NET based objects and messages. WSDL is described in a document titled "Web Services Description Language (WSDL) 1.1," W3C Note January 2001, by Microsoft and IBM Research, Copyright© 2000 Ariba, International Business Machines Corporation, Microsoft, and is hereby incorporated by reference in its entirety. The XLANG/s language is syntactically similar to C#, thus a C# specification may also be referenced as an aid to understanding the exact syntax. The semantics embodied in XLANG/s are a reflection of those defined in a document entitled "Business Process Execution Language for Web Services," Version 1.1, dated Mar. 31, 2003, published by Microsoft, IBM and BEA for the definition of Business Process semantics, which is also hereby incorporated by reference in its entirety. The Business Process Execution Language for Web Services specification is commonly referred to as the "BPEL4WS" specification. As may be appreciated, therefore, the use of XLANG/s is most advantageous when applied to a business process.

XLANG/s defines a rich set of high-level constructs used to define a business process. XLANG/s statements generally fall into one of two categories: simple statements that act on their own, such as receive or send, and complex statements that contain or group simple statements and/or other complex statements. XLANG/s also supports low-level data types such as strings or integers, for example. High-level data types are also defined such as, for example, messages, ports (locations to which messages are sent and received), correlations and service links. The data types are used to rigorously define the semantics associated with the business process.

As noted above, a XLANG/s service communicates with the outside world by sending and/or receiving messages. The message type is the structural definition of such a message. Messages are acted upon by operations (e.g., receive, response), and an operation may be either a single asynchronous message or a request-response pair of messages. Operations may be either incoming or outgoing. For example, a seller may offer a service/product that begins an interaction by accepting a purchase order (from a potential buyer) by way of an input message. The seller may then return an acknowledgement to the buyer if the order can be fulfilled. The seller may send additional messages to the buyer (e.g., shipping notices, invoices). Typically, these input and output operations occur in accordance with a defined sequence, referred to as a "service process." The seller's service remembers the state of each purchase order interaction separately from other similar interactions. This is particularly advantageous in situations in which the buyer may be conducting many simultaneous purchase processes with the same seller. Also, each instance of a service process may perform activities in the background (e.g., update inventory, update account balance) without the stimulus of an input operation.

A service process may represent an interaction utilizing several operations. As such the interaction has a well-defined beginning and end. This interaction is referred to as an instance of the service. An instance can be started in either of two ways. A service can be explicitly instantiated using some implementation-specific functionality or a service can be implicitly instantiated with an operation in its behavior that is meant to be an instantiation operation. A service instance terminates when the process that defines its behavior terminates.

Services are instantiated to act in accordance with a history of an extended interaction. Messages sent to such services are delivered not only to the correct destination port, but to the correct instance of the service that defines the port. A port is an end point where messages are sent and received by a service. The infrastructure hosting the service supports this routing, thus avoiding burdening every service implementation with the need to implement a custom mechanism for instance routing.

Figure 2:
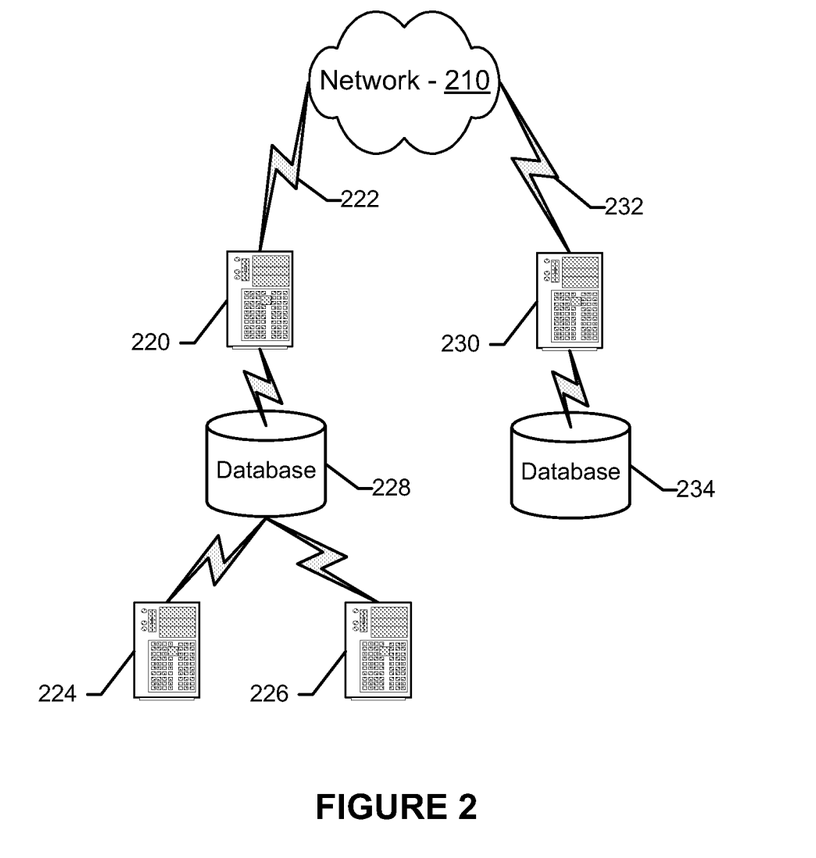
FIG. 2 is a diagram illustrating an exemplary computing network in which aspects of the invention may be implemented.

Turning now to FIG. 2, a simplified, exemplary computer network for enabling communications between two entities is illustrated. A first computer 220, which is any type of computing device such as, for example, computer 110 as disclosed above in connection with FIG. 1, a special-purpose computer or the like, is operatively connected to a network 210 by way of communications link 222. First computer 220 is also operatively connected to a database 228, which in one embodiment contains process-specific information as will be discussed below. Database 228 may be internal to the first computer 220, or may be located on another device. Network 210 may be any type of network for interconnecting a plurality of computing devices, and may be an intranet, the Internet, etc. Communications link 222 may comprise any type of communications medium, whether wired, wireless, optical or the like. Second computer 230, like first computer 220, may be any type of computing device, and is operatively connected to network 210 by way of communications link 232. As can be seen in FIG. 2, second computer 230 is also operatively connected to a database 234.

Communications link 232, like communications link 222, may be any type of communications medium. In one embodiment, communications links 222 and 232 are the same type of communications medium, while in another embodiment the medium employed by each communications link 222 and 232 is different. In FIG. 2, it can be seen that first computer 220 is also operatively connected to computers 224 and 226 by way of database 228. As may be appreciated, additional computers may be operatively connected to second server 230 as well (not shown in FIG. 2 for clarity). It will be appreciated that, although described herein as computers 220, 224, 226 and 230, such computers may be a client or a server computer, or a combination of both, depending on the exact implementation of the computer network and the relationship between computers during a transaction. It will also be appreciated that any combination or configuration of computers and databases is equally consistent with an embodiment of the present invention.

For example, consider a typical supply chain situation in which a buyer sends a purchase order to a seller. The buyer sends the message from, for example, first computer 220 to the seller's second computer 230 by way of the network 210 and communications links 222 and 232. Assume, for example, that the buyer and seller have a stable business relationship and are statically configured—by way of settings stored in databases 228 and 234—to send documents related to the purchasing interaction to the URLs associated with the relevant ports. When the seller returns an acknowledgement for the order, the acknowledgement is routed to the correct service instance at the buyer's end at first computer 220 or, optionally, another computer such as additional computer 224 or 226, by way of database 228. One way to implement such a routing is to carry an embedded token (e.g., cookie) in the order message that is copied into the acknowledgement for correlation. The token may be in the message "envelope" in a header or in the business document (purchase order) itself. The structure and position of the tokens in each message can be expressed declaratively in the service description. This declarative information allows a XLANG/s-compliant infrastructure to use tokens to provide instance routing automatically.

In one embodiment of the present invention, another function of databases 228 and 234 is to serve as a repository for persisted state information for any instances of an orchestration service. For example, first computer 220 transmits a message to second computer 230 in accordance with a service process for a currently-running orchestration service. Upon first computer 220 sending the message, database 228 records the state information for the instance. In such a case, the state information may record that a message has been sent to second computer 230, the content of a message, and that the first computer 220 is waiting for a response. Upon the occurrence of second computer 230 receiving first computer's 220 message, database 234 records the state information for the instance. In the present example, such state information indicates that a message from first computer 220 was received, the contents of such message and that a response must be generated.

Accordingly, if a communication error or power interruption occurs, upon resolution of the problem first computer 220 will know that it has sent a message to second computer 230 and is currently waiting for a response, and second computer 230 will know that it has received a message from first computer 220 and must generate a response. In addition, the storage of state information for an instance of an orchestration service enables the processing of long-running transactions. For example, and as noted above, the business process being implemented by the orchestration service may take a long period of time to generate a response to the message. In such a case, both first and second computers 220 and 230 can process other orchestration services and then return to the instance at the correct point in its service process once the response is generated.

During its lifetime, a service instance may typically hold one or more conversations with other service instances representing other participants involved in the interaction. Conversations may use a sophisticated transport infrastructure that correlates the messages involved in a conversation and routes them to the correct service instance. In many cases, correlated conversations may involve more than two parties or may use lightweight transport infrastructure with correlation tokens embedded directly in the business documents being exchanged. XLANG/s addresses correlation scenarios by providing a very general mechanism to specify correlated groups of operations within a service instance. A set of correlation tokens can be defined as a set of properties shared by all messages in the correlated group. Such a set of properties is called a correlation set.

DESCRIPTION OF EMBODIMENTS OF THE PRESENT INVENTION

The description contained herein is not intended to limit the scope of this patent. Rather, the inventors have contemplated that the claimed subject matter might also be embodied in other ways, to include different elements or combinations of elements similar to the ones described in this document, in conjunction with present or future technologies.

Accordingly, it will be appreciated that an embodiment of the present invention is equally compatible with any type of computer programming language that is capable of automating a distributed process such as, for example, a distributed business process. Therefore, the description herein reflecting the use of XLANG/s is merely illustrative, as any type of equivalent language is consistent with an embodiment of the present invention. In addition, it will be appreciated that the use herein of XLANG/s-specific terminology is done for the sake of clarity and in no way implies that only XLANG/s components or functionality may be used in connection with the present invention. Accordingly, any type of similar components and/or functionality may be used in accordance with an embodiment of the present invention.

In the discussion to follow, it will be appreciated that details pertaining to the automation of distributed processes such as, for example, the programming, configuration and implementation of such processes in software should be known to one of skill in the art and are therefore omitted herein for clarity.

As noted above, a message processing system such as, for example, software that is automating a distributed business process, can receive a greater number of messages than it is capable of processing at the same time. In such a situation, the system devotes too great a percentage of resources toward handling the arrival of the new messages instead of processing the messages that are already active. As a result, thrashing and/or blocking may occur. As noted above, thrashing refers to a state where a system is overwhelmed and spends most of its time moving data into and out of memory rather than performing any useful computations. Blocking refers to a process that remains idle while waiting for something to occur such as, for example, the receipt of a message.

Figure 3:
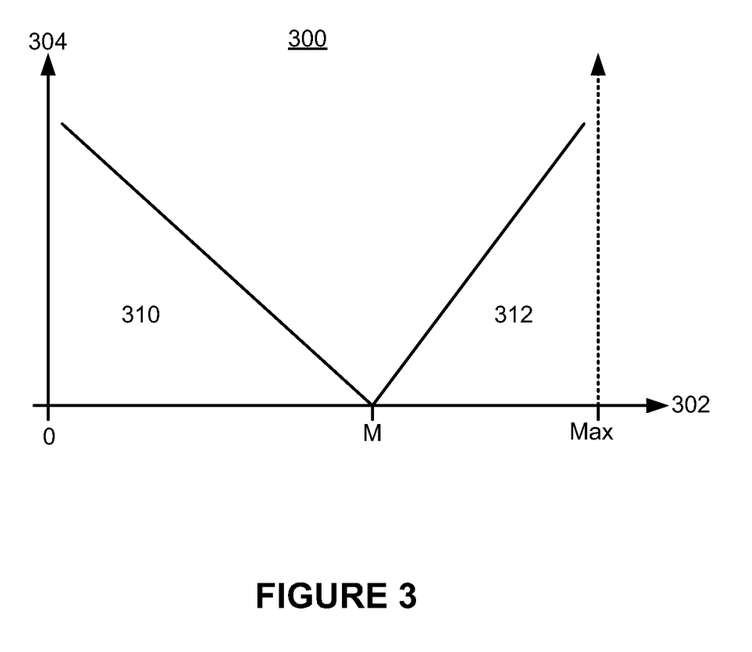
FIG. 3 is a graph illustrating resource management in a message processing system in accordance with one embodiment of the present invention.

Referring now to FIG. 3, a graph 300 illustrating resource management in a message processing system in accordance with one embodiment of the present invention is provided. In FIG. 3, X-axis 302 corresponds to a metric used to measure the workload of a message processing system such as, for example, memory occupied by operations, processor power in use and the like. X-axis 302 varies from a value of zero to a maximum value, denoted by "Max." "M" corresponds to a target utilization of the available memory and resources of the system. Y-axis 304 corresponds to the deviation between a given workload and the target utilization M. Accordingly, the value of the deviation is zero at the target utilization M.

It will be appreciated that in FIG. 3 the region 310 therefore corresponds to an underutilization of system resources, while the region 312 corresponds to an overutilization of system resources. Operation of such a system within the region 312 therefore carries with it the risk of the aforementioned thrashing and blocking. Advantageously, one embodiment of the present invention provides the ability to operate a message processing system as close to the target utilization M as possible. In addition, and as will be discussed below in connection with FIGS. 5A-B, one embodiment of the present invention dynamically determines the target utilization M based on system resources and historical performance data. Accordingly, an embodiment of the present invention determines the target utilization M, and then performs "throttling" and "swapping" as necessary to drive the performance of the system toward the target utilization. Throttling refers to the system's control of the arrival rate of new messages or processes to be executed, and swapping refers to moving—or dehydrating—instances that are already being processed (but are currently idle) to secondary storage to free up system resources.

It will be appreciated that dehydrating an instance carries with it certain processing "overhead" that should be accounted for to ensure efficient operation of the system. For example, in one embodiment dehydration involves storing all of the instance states to a database and clearing active memory of instance-related data. Such tasks take processing time to perform, and therefore in one embodiment of the present invention such dehydration is only to occur when it is determined that the processing and time savings to be achieved by such a dehydration is greater than the associated processing overhead corresponding to performing the dehydration. Otherwise, certain instances will end up taking longer to process because the acts of de- and rehydrating the instance take more time and processing power than would have been consumed if the instance had simply remained in active memory. It will also be appreciated that such a determination may be weighted by certain performance data, or metrics, that can serve as predictors of time and/or processing savings that may result from such a dehydration.

A message processing system such as, for example, XLANG/s-based business automation software, has a structure that may be leveraged by an embodiment of the present invention to ascertain useful metrics for the above determination of the target utilization M. For example, a system in which aspects of one embodiment of the present invention may be implemented can concurrently execute many instances. The arrival of a message may create a new instance or may be directed to an existing instance, and each instance may process many different messages over the instance's lifetime. In addition, instances are instantiations of one of a set of services. The set of available services is fixed—or slowly evolving—thus the same services are run repeatedly on different inputs, thereby providing a history of activity that can be used to predict behavior of future executions. Languages such as XLANG/s have components that measure and record certain metrics regarding the operation of, for example, message processing. As will be discussed in connection with FIGS. 5A-B, such metrics are used to provide resource utilization information, predicted idleness for a given instance, and the like.

Accordingly, in one embodiment of the present invention, a messaging agent is provided that "pulls" in a new message and "pushes" such a message to an independent instance. Likewise, a dehydration controller is also provided that monitors system resource usage and controls instance swapping. The agent uses feedback from the instance state to control any throttling, and the dehydration controller uses the feedback to select swapping candidates. As will be discussed below in connection with FIGS. 5A-B, the throttling algorithm is based on a metric for the amount of unfinished work in the system and the swapping algorithm is based on a metric for predicting idle duration.

Figure 4:
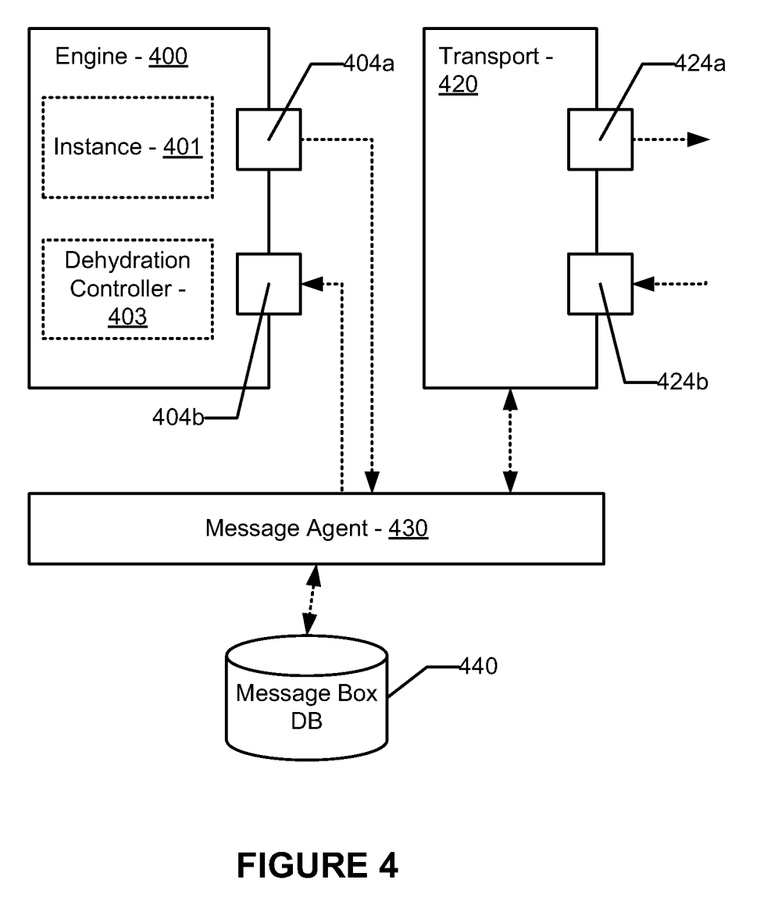
FIG. 4 is a block diagram illustrating a configuration of exemplary software components in which aspects of the invention may be implemented.

Referring now to FIG. 4, a block diagram illustrating a configuration of exemplary software components in which aspects of the present invention may be implemented is shown. In FIG. 4, a process engine 400 that is running one or more instances 401 and one or more dehydration controller 403 is illustrated. It will be appreciated that an engine 400 is, in one embodiment, a service that runs XLANG/s schedule instances 401 and controls the activation, execution, dehydration and rehydration of such instances 401. The engine 400, or one or more instances 401 being run by the engine 400, defines a send port 404a and a receive port 404b. As may be appreciated, each instance 401 may define one or more send and receive ports 404, and so therefore the engine 400 may define a plurality of such ports 404. In addition, the engine 400 may run one or more components that monitor and record performance data (metrics) relating to the processing of messages and other functions. As will be appreciated, in one embodiment such metrics are used to determine whether to throttle messages or swap instances, as will be discussed below in connection with FIGS. 5A-B. The dehydration controller 403, as noted above and as will also be discussed in greater detail below in connection with FIGS. 5A-B, receives feedback from the instance 401 state to select swapping candidates from all instances 401 and forwards such candidates to the engine 400 for dehydration.

A transport 420 is a set of services that includes network protocols and application integration components, which enable a server running the engine 400 to send documents to organizations or applications whether or not the applications are capable of communicating directly with the server by using, for example, a COM interface. In one embodiment, XLANG/s supports, for example, the file, HTTP, HTTPS, and SMTP network protocols, as well as Message Queuing and the like. It will be appreciated that the transport 420 transmits and receives messages according to the particular instance being processed by the engine 400. As was the case with engine 400, the transport 420 defines a send port 424a and a receive port 424b, by which the transport 420 communicates with other software or hardware components, or other computing devices.

The messaging agent 430, in one embodiment, is a computing abstraction that controls access to the message box database 440 and is capable of implementing relevant portions of the method to be discussed below in connection with FIGS. 5A-B. It will be appreciated that the messaging agent 430, in one embodiment, performs such activities in conjunction with the transport 420. In an embodiment implemented in XLANG/s, for example, the messaging agent 430 and transport 420 interact with each other by "publishing" messages and/or other data from the transport 420 to the messaging agent 430, and by "subscribing" to messages and/or other data from the messaging agent 430 to the transport 420.

The message box database 440 contains, for example, message information pertaining to a XLANG/s instance being run by the engine 400. The message box database 440, or another database or memory device, is also capable of storing the instance when or if such instance is dehydrated. Thus, the exemplary software and hardware components introduced in the discussion of FIG. 4 above will now be discussed in the context of the method of FIGS. 5A-B. As noted above, in a typical process automation application an instance such as, for example, instance 401 as discussed above in connection with FIG. 4, is a program executing a service. In one embodiment, an instance is "pushed" a message. In other words, an instance is delivered a message when the message arrives, rather than the instance asking for a message when the instance is ready for such a message. The instance contains a set of one or more tasks, which may be dynamically changing. If the instance reaches a state in which it requires input that is not currently available (e.g., the instance is waiting to receive a message) then the task blocks. The place in code at which the instance blocks is the instance's blocking location.

A messaging agent such as, for example, message agent 430, supplies each running instance with messages as such messages arrive by way of transport 420 or the like. The message agent 430 retrieves each new message and assigns it to the proper instance. If an appropriate instance does not exist then the message agent 430 creates a new instance of the correct service type and delivers the message to the new instance. A message that necessitates the creation of a new instance is referred to as an activation message. Thus, the message agent 430 controls the arrival of messages. In one embodiment, the message agent 430 accomplishes this task by polling for new messages at given rate. A message agent 430 according to an embodiment has the ability to; for example, control the rate at which the agent polls for new messages, and also to selectively poll only for non-activation messages.

As will be discussed below in connection with FIGS. 5A-B, the throttling algorithm is executed by the message agent 430. According to one embodiment of the present invention, the message agent 430 operates in one of three states: a state where the message agent 430 aggressively polls for all messages at a high frequency and in multiple threads and assigns such messages to instances (referred to hereinafter for reference as state "A"), a state where the message agent 430 polls for only non-activation messages at a frequency adaptively determined by the availability of such messages in the message box 440 and assigns such messages to instances (state "B"), and a state where the message agent 430 completely suspends polling of any message from the message box 440 until the overall usage of system resources returns to normal and the system is able to accept and process new messages (state "C").

Figure 5A:
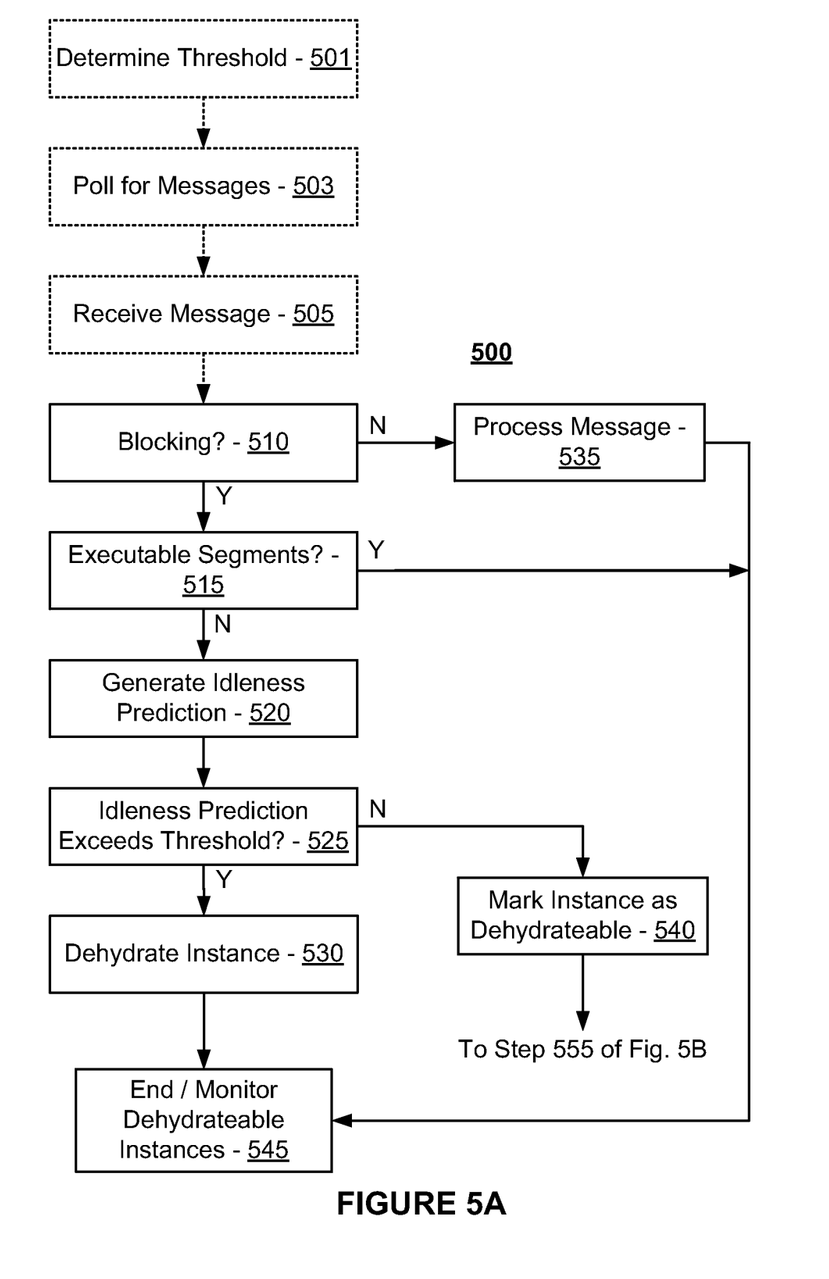
FIGS. 5A-B are flowcharts illustrating an exemplary method of managing message processing in accordance with one embodiment of the present invention detailed description of illustrative embodiments

Turning now to FIG. 5A, a flowchart depicting a method 500 for controlling throttling and swapping according to an embodiment of the present invention is illustrated. It will be appreciated that the dotted lines surrounding steps 501-505 indicate that, while steps 501-505 are located at the beginning of method 500 for clarity, such steps 501-505 may take place at any time during the method 500, including taking place at the same time as steps 510-550, as well as steps 555-570 of FIG. 5B. In fact, steps 501-505 may take place completely independently from the remaining steps of the method 500. Thus, it will be appreciated that the throttling functionality of one embodiment of the present invention polls for new messages, while the swapping functionality dehydrates blocked instances so as to free up system resources. In an embodiment, each action is interrelated, as the freeing up of system resources affects which state (e.g., A, B or C) governs the polling for new messages, and the arrival rate of new messages affects the overall usage of system resources. Thus, a type of feedback loop is created, whereby an embodiment of the present invention takes actions based on changing metrics to keep the system operating at or near an optimum workload.

Therefore, at step 501, the method 500 determines a state that indicates the polling rate at which new messages should be retrieved. In one embodiment, the message agent 430 moves from state to state based on a current value of a stress metric, J, and two predefined values: a low-watermark, L, and a high-watermark, H. The message agent 430 begins in, for example, state A. In state A or B, if J becomes greater than H then the agent moves to state C. When the message agent 430 is operating in state C, if J drops below H then the agent moves to state B. When the message agent 430 is operating in state B, if J drops below L then the agent moves to state A.

As noted above, when the message agent 430 is in state B or C, no new instances are created; however existing instances can continue to make progress. In one embodiment, the purpose of J is, for example, to be a measure of the amount work remaining to be completed by the instances. Any type of work measurement may be used while remaining consistent with an embodiment of the present invention. For example, J may be implemented as the number of unprocessed messages, or the number of executing tasks. It will be appreciated that the values for L and H, as well as the high and low frequency polling rates are constant parameters determined by the choice of metric and based on the size and capabilities of the hosting environment. Thus, such values and rates may be any rates that may be assigned, based on the software and hardware configuration that is implementing the method 500.

Accordingly, at step 503 the method 500 polls for messages according to the determination of step 501. It will be appreciated that during such a poll, the method 500 may receive any number of messages, including none at all. At step 505, the method receives a message. It will be appreciated that such a message may be an initiation message if such message does not correspond to a currently-running instance. Therefore, step 505 may include additional steps necessary to create an instance and/or to route the message to a currently-running instance.

At step 510, a determination is made as to whether an instance in question is blocked. The determination of step 510 may be made either as a result of receiving a message, or may be performed on a periodic or other basis according to the dehydration controller's 403 functionality. As discussed above, an instance may be blocked as a result of, for example, waiting to receive a message. Thus, it will be appreciated that in most embodiments, the blocked condition of an instance is not the result of receiving a message at step 505. If the instance is not blocked, then the method 500 processes the message (if a message was received) at step 535 according to the message system's usual protocols. Once the message has been processed at step 535, or if no message was received, the method 500 proceeds to step 545, which will be discussed in greater detail below.

At step 515, a determination is made as to whether any segments of the instance are executable, or if all of such segments are blocked and therefore have no processing activity. If such instance is completely blocked, the method 500 continues to step 520. If any segments are executable, the method 500 proceeds to step 545, below. It will be appreciated that in one embodiment only completely blocked instances can be candidates for swapping, as otherwise the previously-discussed overhead associated with swapping offsets any resource savings that may occur as a result of such swapping. However, application specifics may permit, in some embodiments, only partially blocked instances to be swapped.

At step 520, an idleness prediction is generated. As discussed above, such a prediction permits the method 500 to make a determination whether, on average, the processing and resource savings that will result from swapping a blocked instance will be worth the processing overhead associated with such swapping. As also discussed above, the dehydration controller 403 determines when an instance needs to be swapped and which instance, out of all instances, should be swapped. The dehydration controller 403 decides to swap based on its monitoring of the current resource usage of the system, and determines which instance to swap based on a prediction of how long the instance is likely to remain idle. As noted above, in one embodiment metrics regarding, for example, the performance of the system are used to make such determinations. Such metrics may include, for example: memory usage, processor resources used, historical data regarding blocking time and the like, and so forth. In addition, such metrics may be recorded with respect to the entire system, a particular process or processes, a service, and instance, and/or the like. For example, in one embodiment the system records the idle time spent at each blocking location for a particular service. The service then uses such information when determining the expected idle time at a blocking location during a particular instance of the service.

As also noted above, a service S may have one or more instances, I(S), running at any given time. If such an instance I(S) is idle then the instance I(S) contains a set of blocked tasks that are waiting at a set of blocking locations, $B_{I(S)}$. The expected idle time for I(S), denoted $t_{I(S)}$, can therefore be computed based on the past behavior of instance I(S) when the instance's I(S) tasks were similarly blocked. One such function for computing $t_{I(S)}$ is simply to treat the locations independently; that is, to take the minimum of the average past idle time at the blocking location $B_{I(S)}$ minus the time that I(S) has already been blocked at the location $B_{I(S)}$.

At step 525, the dehydration controller 403 determines whether the expected idle time $t_{I(S)}$ exceeds a threshold T, which may be predetermined and/or determined as needed in a dynamic manner. The dehydration controller 403 maintains the threshold value T such that if $t_{I(S)}>T$ then I(S) is swappable. As may be appreciated, any such computation for determining $t_{I(S)}$, T and the like so as to determine a value against which the idle nature of an instance I(S) may be used while remaining consistent with an embodiment of the present invention.

In an embodiment, the dehydration controller 403 recomputes T at fixed intervals, on demand, or the like. If T≥maxT then no swapping occurs. If T≤minT then all idle instances are swapped out. Otherwise T is adjusted up or down according to how far from ideally the system is using its resources. The value of T can be computed based on any metric for measuring system resource consumption. For example, one embodiment that employs memory usage as a metric for such computations occurs as follows. First, the current memory consumption level, m is computed. Then a determination is made as to whether m<minM and, if so, T is set to maxT. If m>maxM then T is set to 0, and if m<M then T=T+ΔT. Finally, if m>M then T=T−ΔT. It will be appreciated that minM<M<maxM are constant values for the minimum, target (ideal value), and maximum memory consumption levels, respectively, and ΔT is a function of m, T, minM, M and maxM. It will also be appreciated that, in one embodiment, ΔT has the properties of being negative when m>M, positive when m<M and converging monotonically toward a zero value when m approaches M.

Thus, if the determination of step 525 is that $t_{I(S)}>T$, the instance I(S) is dehydrated at step 530. It will be appreciated that any manner of instance dehydration is consistent with an embodiment of the present invention. As noted above, in one embodiment, dehydration consists of saving data related to the instance I(S), including all state information, to a database or other stable memory device, and removing all or part of such data from active memory. In addition, such dehydration may take place immediately, or the instance may be placed in a dehydration queue, whereby the instance is dehydrated when sufficient system resources are available for such dehydration. After the instance I(S) has been dehydrated, the method 500 proceeds to step 545. At step 545, and in one embodiment, normal processing and/or polling continues until the method 500 needs to be resumed. In addition, at step 545, all dehydrated instances I(S) are monitored to determine whether a new message for a dehydrated instance I(S) has arrived. If so, the method 500 rehydrates the instance I(S) and processes the message.

If, at step 525, a determination is made that $t_{I(S)}\leq T$, then the instance I(S) is marked as "dehydrateable" at step 540. Dehydrateable means that the instance I(S) is blocked and has no executable segments, and therefore may be dehydrated without adversely affecting any active processes. However, because the expected idle time $t_{I(S)}$ does not exceed the predetermined threshold T, the resource savings that would result from dehydrating the instance I(S) may not be enough to warrant carrying out dehydration in view of the processing overhead involved with dehydrating the instance. As a result, a further determination as to whether the instance I(S) should be dehydrated is made in the method 500 as discussed below in connection with FIG. 5B. Thus, step 540 of FIG. 5A leads to step 555 of FIG. 5B.

As noted above, swapping out an instance I(S) reduces memory consumption, m, which tends to make tasks run faster on a message processing system thus also reducing J and, in one embodiment, enabling the system to operate at a higher state (e.g., A, B or C). Slowing and/or stopping activation of new tasks tends to reduce J and m. In this way, throttling and swapping work together to reduce the strain on a message processing system and keep tasks executing efficiently.

Figure 5B:
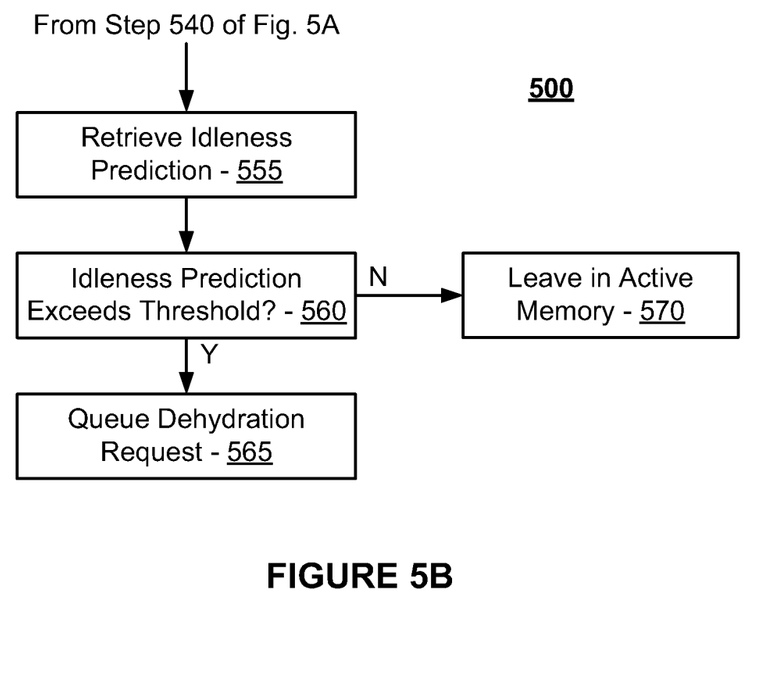

Referring now to FIG. 5B, the method 500 continues at step 555. In the present discussion of the method 500 of FIG.

5B, it will be appreciated that steps 555-570 require a small amount of computing power and/or system resources as compared to maintaining an instance in active memory, or the computing overhead associated with dehydrating and rehydrating the instance. Therefore, at step 555, the expected idle time $t_{I(S)}$ is retrieved. It will be appreciated that between the time of executing step 525 of FIG. 5A and the execution of step 560, the threshold T may have been updated or changed. Thus, at step 560, a determination is again made as to whether $t_{I(S)}>T$. It will be appreciated that the time the instance I(S) has already been blocked at the location $B_{I(S)}$ will have increased between the time of executing step 525 of FIG. 5A and the execution of step 560. In situations where no data is available—for example, when no data has yet been collected about a particular blocking location, one embodiment of the present invention assumes that the expected idle time $t_{I(S)}$ is equal to the amount of time the instance I(S) has already been blocked. In such an embodiment, therefore, the expected idle time $t_{I(S)}$ increases as the amount of idle time increases. It will be appreciated that any convention may be used in situations where no data is available about a blocked location, and that such a convention may be predetermined and/or decided upon as needed.

If the result of the determination of step 560 is the same as the determination of step 525 of FIG. 5A, namely that $t_{I(S)} \leq T$, then the instance I(S) is left in active memory as at step 570, as the processing and resource benefit from dehydrating the instance I(S) is not expected to outweigh the processing and resource overhead associated with dehydrating and rehydrating the instance I(S). If, at step 560, the determination is made that $t_{I(S)}>T$, then the method 500 proceeds to step 565. At step 565, a request to dehydrate the instance I(S) is queued and ultimately the instance I(S) is dehydrated.

Thus, a method and system for using metrics to control throttling and swapping in a message processing system has been provided. While the present invention has been described in connection with the exemplary embodiments of the various figures, it is to be understood that other similar embodiments may be used or modifications and additions may be made to the described embodiment for performing the same function of the present invention without deviating therefrom. For example, one skilled in the art will recognize that the present invention as described in the present application may apply to any type or configuration of business automation software in any type of application environment. Therefore, the present invention should not be limited to any single embodiment, but rather should be construed in breadth and scope in accordance with the appended claims

What is claimed:

1. A system for improving the efficiency of a web service message processing system, the system comprising a processor and a memory communicatively coupled to the processor, the memory comprising instructions that, when executed by the processor, cause the system to:
    determine a workload of the web service message processing system based on performance metrics of the web service message processing system;
    receive a message at the web service message processing system and, in response to receiving the message, create an instance of a process or route the message to an existing instance of a process;
    idle the created instance or the existing instance based on the determined workload of the web service message processing system;
    determine a predicted duration for the idling based on the performance metrics;
    based on the predicted duration, move the idled instance out of active memory and into secondary storage associated with the web service message processing system; and
    update the determined workload based on updated performance metrics and said moving the idled instance out of active memory.

2. The system of claim 1, wherein the performance metrics are based on memory consumed by active message processing.

3. The system of claim 1, wherein the performance metrics are based on processing power used for active message processing.

4. The system of claim 1, wherein the performance metrics are based on idle time of a past process.

5. The system of claim 1, wherein the performance metrics are assigned according to a predetermined criterion.

6. The system of claim 1, wherein the idled instance is moved out of active memory based on whether the predicted duration exceeds a predetermined threshold.

7. The system of claim 6, wherein the predetermined threshold is based on a prior idle process.

8. A method for improving the efficiency of a web service message processing system, the method comprising:
    determining, by the web service message processing system, a workload state based on performance metrics of the web service message processing system;
    in response to receiving a message at the web service message processing system, performing one of creating an instance of a process or routing the message to an existing instance of a process;
    idling the created instance or the existing instance based on the determined workload state;
    predicting a duration of said idling based on the performance metrics; and
    moving the idled instance to secondary storage based on the predicted duration.

9. The method of claim 8, wherein the performance metrics are based on memory consumed by active message processing.

10. The method of claim 8, wherein the performance metrics are based on processing power used for active message processing.

11. The method of claim 8, wherein the storage is associated with a web service message processing system.

12. The method of claim 8, wherein the performance metrics are based on idle time of a past process.

13. The method of claim 8, wherein the performance metrics are assigned according to a predetermined criterion.

14. The method of claim 8, wherein the system determines whether the predicted duration exceeds a predetermined threshold.

15. The method of claim 14, wherein the predetermined threshold is based on a prior idle process.

16. A system for improving the efficiency of a message processing system, the system comprising a processor and a memory communicatively coupled to the processor, the memory comprising instructions that, when executed by the processor, cause the system to:
    determine a workload of the message processing system by accessing performance data regarding the message processing system, and determining, using the performance data, the workload with respect to a system operating parameter;
    identify a blocked instance being processed by the message processing system;

calculate an expected idle time for the blocked instance by:
  accessing performance data for the message processing system;
  determining a length of time the blocked instance has been idle; and
  generating the expected idle time based on the performance data and the length of time the blocked instance has been idle;
move the blocked instance to secondary storage if the expected idle time exceeds a threshold;
update the workload based on moving the blocked instance; and
update the threshold according to the updated workload.

17. The system of claim 16, wherein the accessed performance data comprises at least one of:
memory usage, processor power in use by the message processing system, or assignments according to a predetermined criterion if no performance data is accessible.

18. The system of claim 16, further comprising instructions that, when executed by the processor, cause the system to poll for a new message at a frequency according to the workload status, wherein the frequency is inversely proportional to the workload and, if the workload is above a predetermined limit, polling only for a new non-activation message.

19. The system of claim 18, wherein the polling further comprises polling only for a new non-activation message.

20. The system of claim 16, wherein the blocked instance is a first instance, and the performance data comprises a recorded idle time of a second instance.

* * * * *